US010202243B1

(12) United States Patent
Lisso et al.

(10) Patent No.: US 10,202,243 B1
(45) Date of Patent: Feb. 12, 2019

(54) AIR PRESSURE ASSISTED CONVEYANCE SYSTEM

(71) Applicant: Amazon Technologies, Inc., Seattle, WA (US)

(72) Inventors: Gregory Karl Lisso, Bellevue, WA (US); Steven Klehr, Maple Valley, WA (US); Sean Maylone, Seattle, WA (US); Laura Rubin, Seattle, WA (US); Vignesh Kumar Sivasamy, Bellevue, WA (US); Samuel Christopher Uhlman, Kirkland, WA (US); Scott Douglas King, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 15/377,240

(22) Filed: Dec. 13, 2016

(51) Int. Cl.
*G06F 7/00* (2006.01)
*B65G 43/08* (2006.01)
*B65G 47/96* (2006.01)
*B65G 17/34* (2006.01)
*B65G 13/02* (2006.01)
*B65G 51/03* (2006.01)

(52) U.S. Cl.
CPC ............ *B65G 43/08* (2013.01); *B65G 13/02* (2013.01); *B65G 17/345* (2013.01); *B65G 47/965* (2013.01); *B65G 51/03* (2013.01)

(58) Field of Classification Search
None
See application file for complete search history.

(56) References Cited

U.S. PATENT DOCUMENTS

| | | | | | |
|---|---|---|---|---|---|
| 3,613,883 | A * | 10/1971 | Starbuck | ............... | B07C 5/12 |
| | | | | | 209/551 |
| 4,435,941 | A * | 3/1984 | Booth | ............... | B65B 25/046 |
| | | | | | 53/247 |
| 4,971,742 | A * | 11/1990 | Brooks | ............... | B27N 1/00 |
| | | | | | 264/115 |
| 6,148,589 | A * | 11/2000 | Fukui | ............... | B65B 9/073 |
| | | | | | 53/135.1 |
| 6,460,842 | B1 * | 10/2002 | Koelle | ............... | B65H 29/242 |
| | | | | | 270/52.09 |
| 2007/0107918 | A1 * | 5/2007 | Coe | ............... | A61F 13/15747 |
| | | | | | 172/695 |
| 2009/0129911 | A1 * | 5/2009 | Jansen | ............... | B65G 21/2036 |
| | | | | | 414/754 |
| 2018/0147860 | A1 * | 5/2018 | Reinsch | ............... | B41F 21/00 |

* cited by examiner

*Primary Examiner* — Yolanda R Cumbess
(74) *Attorney, Agent, or Firm* — Thomas Horstemeyer, LLP (57) ABSTRACT

Disclosed are various embodiments for using air pressure to increase or decrease the force of static friction between an item and the surface of a conveyance system. The conveyance system can include a track and a conveyor segment affixed to the track. The conveyor segment can include an air permeable surface on which an item can be placed. Mounted underneath the air permeable surface is an air displacement device.

20 Claims, 11 Drawing Sheets

AIR PRESSURE ASSISTED CONVEYANCE SYSTEM

BACKGROUND

Logistics facilities (e.g., warehouses, shipping centers, etc.) often use materials handling systems to move items from one point to another or to sort items. Materials handling systems can include conveyor belts, beds, trays or similar devices. These materials handling systems often rely on gravity to anchor items to the materials handling systems as the items are moved.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments of a conveyance system that uses air pressure to supplement the normal gravitational force of an item on a conveyance system by increasing the force of static friction between an item and the conveyance system at key points along a material handling path, e.g., during turns in a conveyance mechanism, or during sorting, when the item is acted on by forces that interrupt or alter the momentum of the item along the path. By increasing the force of static friction between an item and the conveyance system, the conveyance system can be operated at higher speeds compared to conveyance systems that rely solely on gravity to hold an item in place using static friction. Due to the higher force of static friction, items are less likely to slip or lose contact with the conveyance system when operated at higher speeds. By increasing the force of static friction between the item and the conveyance system, the conveyance system can also be configured to make sharper turns, or traverse steeper inclines and declines compared to conveyance systems that rely solely on gravity to hold an item in place using static friction. Due to the higher force of static friction, items are less likely to slide off the conveyance system as a change in direction of travel (e.g., turning a corner) or a change in elevation (e.g., moving between levels or between stories in a building) occurs. In the following discussion, a general description of the system and its components is provided, followed by a discussion of the operation of the same.

Figure 1:
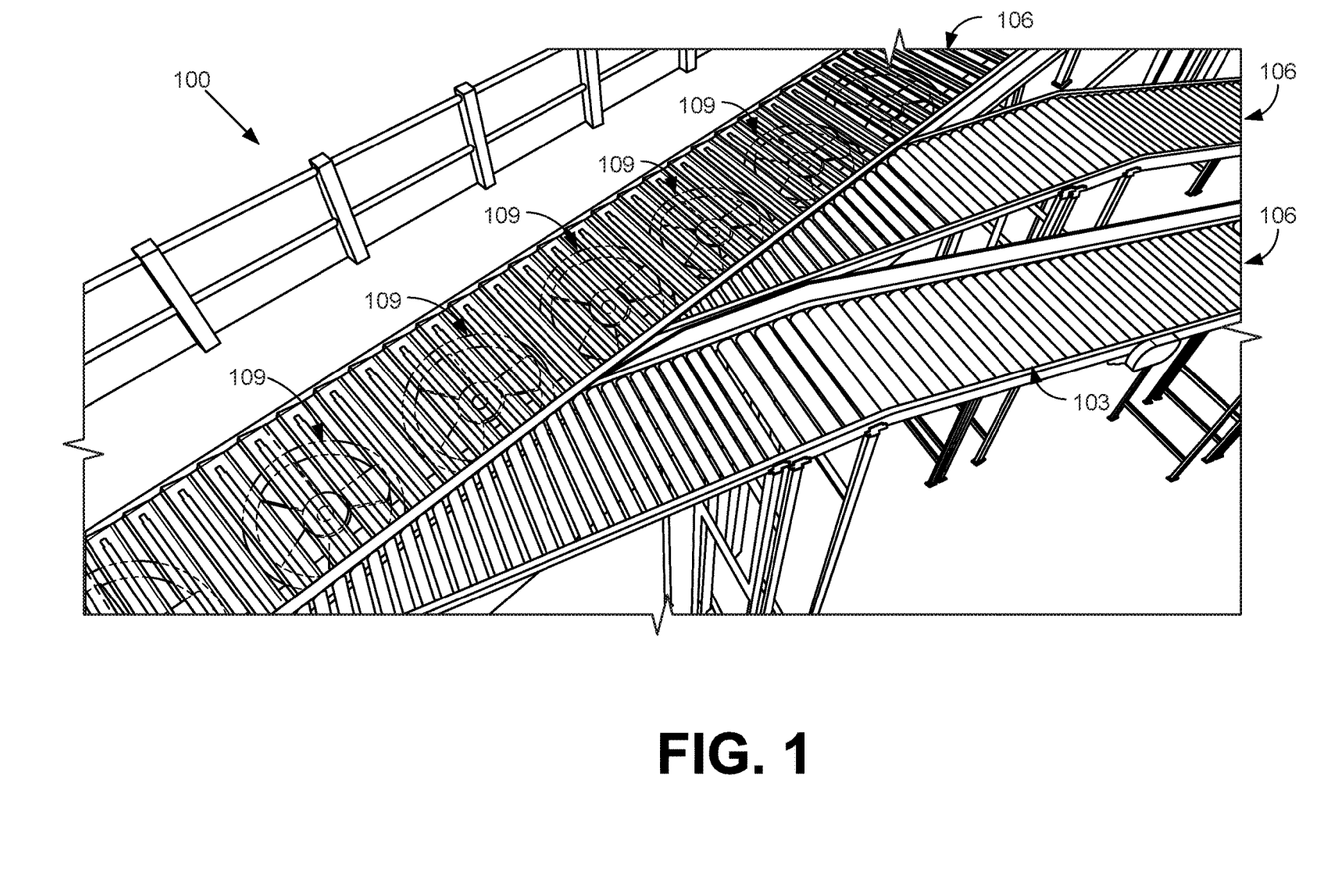
FIG. 1 is a drawing depicting one of several embodiments of the present disclosure.

FIG. 1 depicts one of the various embodiments of the present disclosure. Here, a conveyance system 100 comprising a plurality of rollers 103 along several tracks 106 is depicted. One or more of the rollers 103 may be spun by one or more motors attached to a respective track 106. As illustrated a number of fans 109 are mounted underneath the rollers 103 along one of the tracks 106. The fans 109 can be spun to pull air down through the rollers 103. This airflow applies additional downward force, in addition to gravity, thereby increasing the amount of fiction between the rollers 103 above the fans 109 and individual items. The gaps between the individual rollers 103 on the tracks 106 result in the track 106 acting as an air permeable surface through which the fans 109 can pull air.

Figure 2:
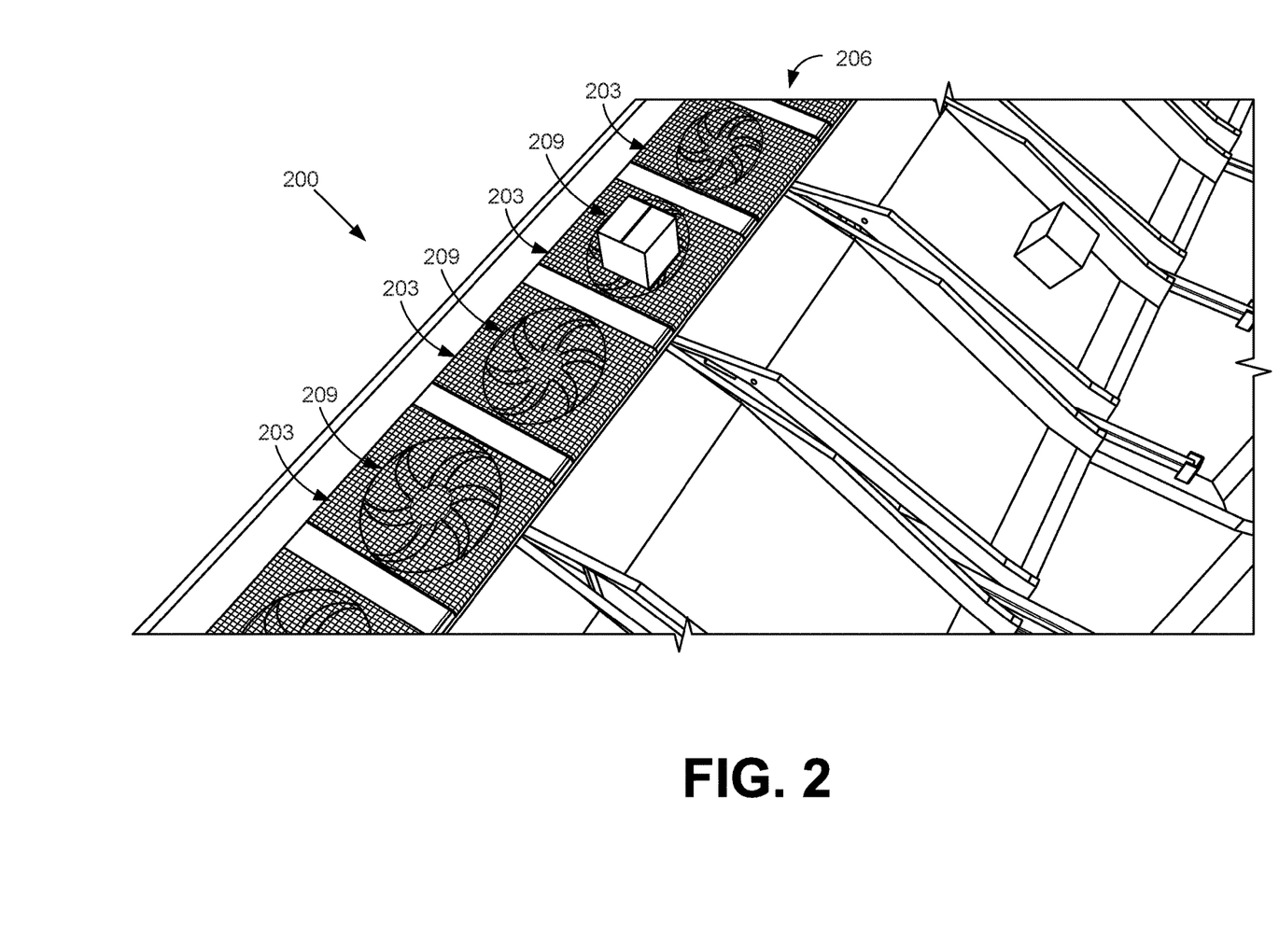
FIG. 2 is a drawing depicting one of several embodiments of the present disclosure.

FIG. 2 depicts an embodiment of a cross-belt sorter, according to various embodiments of the present disclosure. Here, a conveyance system 200, such as a cross-belt sorter that includes a plurality of cross-belt segments 203 mounted to a track 206, is depicted. Each cross belt segment 203 includes an air permeable conveyor belt that moves across the conveyor segment 203 at an angle relative to the track 206. The air permeable conveyor belt can include a perforated belt, a chain-link belt, or other conveyor belt that allows air to pass through it. Here, the air permeable conveyor belts of the individual conveyor segments 203 that are depicted operate perpendicularly relative to the track 206 to move items into various slides.

Each cross-belt segment 203 can include an air displacement device 209, such as a fan, suction pump, reverse Venturi valve, or similar device. In these instances, the air displacement device 209 is mounted to the cross-belt segment 203 beneath the air permeable conveyor belt. However, in other instances, the air displacement device 209 could be mounted to the track 206 in order to remain in a stationary position. In these instances, a cross-belt segment 203 would cross over an air displacement device 209 as the cross-belt segment moved along the track 206. In either instance, as the air displacement device 209 draws air down through the air permeable conveyor belt, the resulting suction helps secure the item to the cross-belt segment 203. Both the cross-belt segment 203 and the air displacement device 209 can be powered by an electric rail mounted to an interior surface of the track 206.

Figure 3:
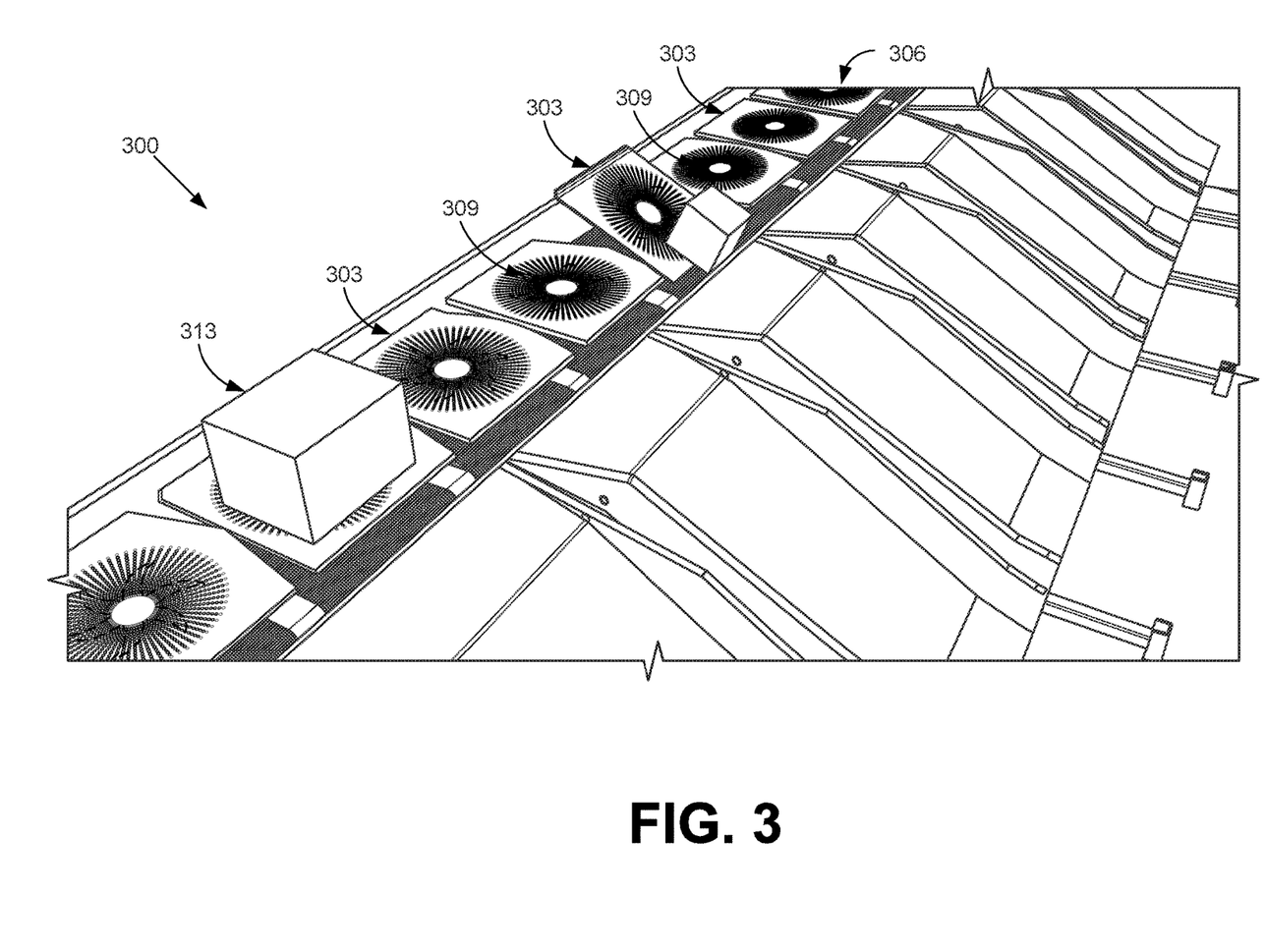
FIG. 3 is a drawing depicting one of several embodiments of the present disclosure.

FIG. 3 depicts an embodiment of a tilt-tray sorter, according to various embodiments of the present disclosure. Here, the conveyance system 300 includes a plurality of tilt-trays 303 mounted to a track 306. Each tilt-tray 303 includes an air permeable surface on which an item can be placed. The air permeable surface can include, for example a perforated surface or other surface that allows air to pass through it.

Each tilt-tray 303 includes an air displacement device 309, such as a fan, suction pump, reverse Venturi valve, or similar device. The air displacement device 309 is mounted beneath the air permeable surface of the tilt-tray 303. As the air displacement device 309 draws air down through the air permeable surface, the resulting suction helps secure the item 313 to the tilt-tray 303. Both the tilt-tray 303 and the air displacement device 309 can be powered by an electric rail mounted to an interior surface of the track 306.

Figure 4:
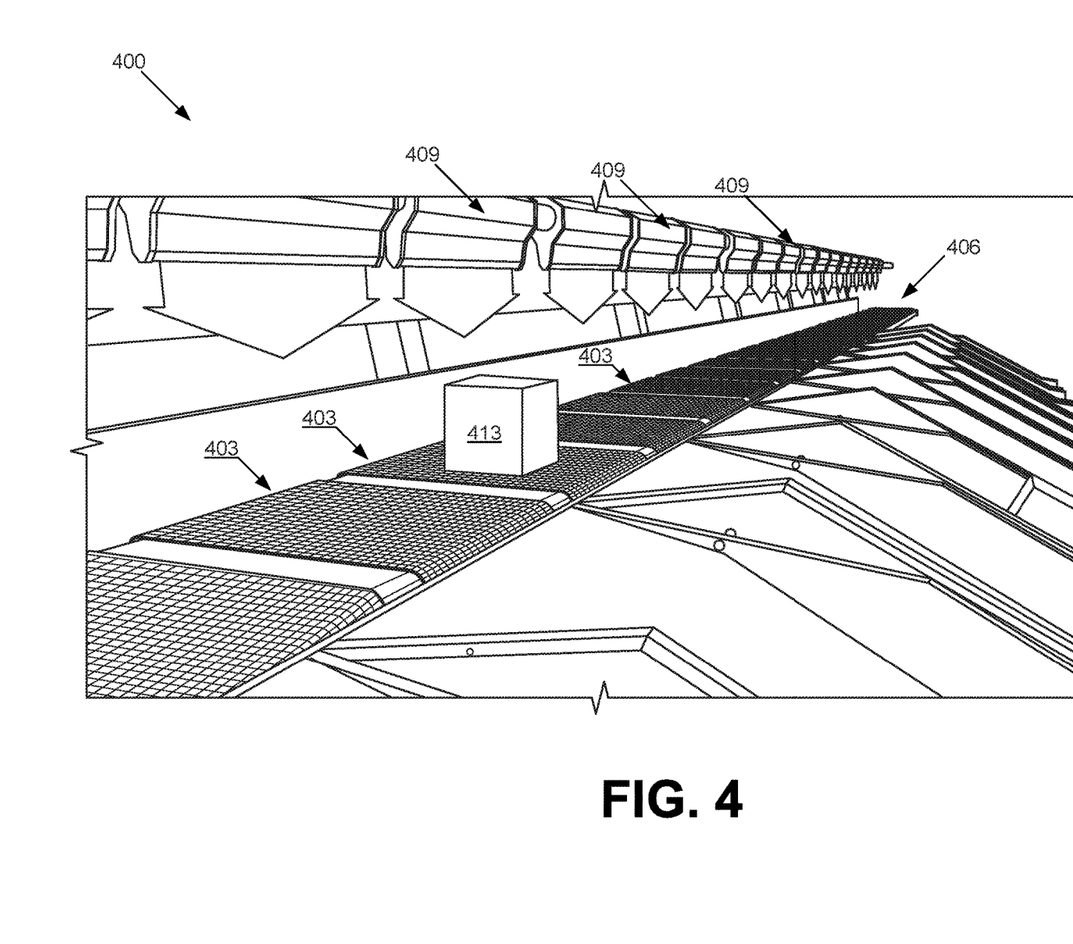
FIG. 4 is a drawing depicting one of several embodiments of the present disclosure.

FIG. 4 depicts another one of the various embodiments of the present disclosure. Here, a conveyance system 400, such as a cross-belt sorter that includes a plurality of cross-belt segments 403 mounted to a track 406, is depicted. Each cross belt segment 403 includes an air permeable conveyor belt that moves across the conveyor segment 403 at an angle relative to the track 406. The air permeable conveyor belt can include a perforated belt, a chain-link belt, or other conveyor belt that allows air to pass through it. Here, the air permeable conveyor belts depicted operate at a 90 degree angle relative to the track 406 to move items into various slides.

Above the track 406 is a series of air displacement devices 409. An air displacement device 409 could include a fan, blower, or similar device. Each of the air displacement devices blows air down, as depicted by the arrow in FIG. 4, onto the track 406. The air flows through the air permeable conveyor belts of the individual cross-belt segments 403, thereby applying positive air pressure to items 413 on their respective cross-belt segments 403. In some embodiments, the air displacement devices 409 may be stationary. In other embodiments, the air displacement devices 409 can be mounted to their own track, allowing individual air displacement devices 409 to be moved synchronously with a corresponding cross-belt segment 403.

Figure 5:
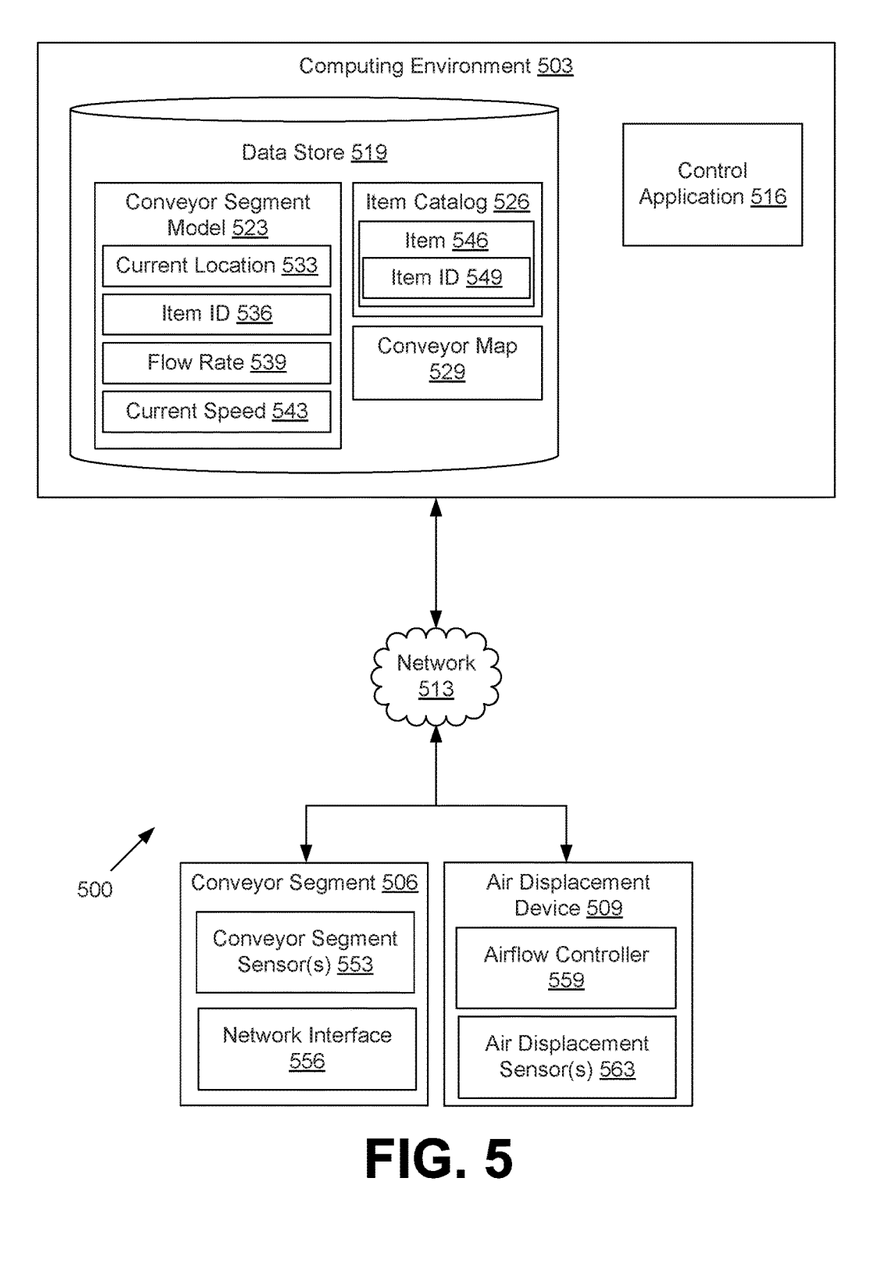
FIG. 5 is a drawing of a networked environment according to various embodiments of the present disclosure.

FIG. 5 depicts a networked environment 200 according to various embodiments of the present disclosure. The networked environment 200 includes a computing environment 503, a conveyor segment 506, and an air displacement device 509, which are in data communication with each other via a network 513. The network 513 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 513 can also include a combination of two or more networks 513. Examples of networks 513 can include the Internet, intranets, extranets, virtual private networks (VPNs), and similar networks.

The computing environment 503 may include, for example, a server computer or any other system providing computing capability. Alternatively, the computing environment 503 may employ a plurality of computing devices that may be arranged, for example, in one or more server banks or computer banks or other arrangements. Such computing devices may be located in a single installation or may be distributed among many different geographical locations. For example, the computing environment 503 may include a plurality of computing devices that together may include a hosted computing resource, a grid computing resource or any other distributed computing arrangement. In some cases, the computing environment 503 may correspond to an elastic computing resource where the allotted capacity of processing, network, storage, or other computing-related resources may vary over time.

Various applications or other functionality may be executed in the computing environment 503 according to various embodiments. The components executed on the computing environment 503, for example, include a control application 516 and other applications, services, processes, systems, engines, or functionality not discussed in detail herein.

The control application 516 is executed to control the operation of individual conveyor segments 506 and air displacement devices 509. For example, the control application 516 can adjust the air flow generated by an air displacement device 509 to alter the amount of suction or lift generated by the air displacement device 509. As another example, the control application 516 can increase or decrease the speed at which a track moves individual conveyor segments 506.

Also, various data is stored in a data store 519 that is accessible to the computing environment 503. The data store 519 may be representative of a plurality of data stores 519, which can include relational databases, object-oriented databases, hierarchical databases, hash tables or similar key-value data stores, as well as other data storage applications or data structures. The data stored in the data store 519 is associated with the operation of the various applications or functional entities described below. This data can include conveyor segment models 523, an item catalog 526, a conveyor map 529, and potentially other data.

The conveyor segment model 523 represents a data model of an individual conveyor segment 506. Accordingly, the conveyor segment model 523 may include data such as the current location 533 of a conveyor segment 506, an item identifier 536 of an item positioned on the conveyor segment 506, a current air flow rate 539 representing the volume of air flowing over the modeled conveyor segment 506 or the air pressure applied to modeled conveyor segment 506, and a current speed 543 of a conveyor segment 506. The air flow rate 539 can represent the air flow or air pressure generated by the air displacement device 509, as well as air flow or air pressure generated from other sources (e.g., ambient air pressure). The conveyor segment model 523 may also include additional state information about a corresponding conveyor segment 506.

The item catalog 526 represents a list or catalog of items 546 that could be conveyed by a conveyor segment 506. For individual items 546 stored in the item catalog 526, information such as the weight and dimensions of the item 546 may be stored, as well as potentially other data (e.g., handling instructions). An individual item 546 may also be referenced by an item identifier 549, allowing for an item 546 to be identified and information about the item 546 to be retrieved from the item catalog 526.

The conveyor map 529 represents a map of the track that moves individual conveyor segments 506. The conveyor map 529 stores information about the location of various sections of the track that moves the conveyor segments 506 in order for the control application 516 to determine the location of a conveyor segment 506 on the track. The information can include an identifier of the section (e.g. package ingress area, sorting area, package egress area, change in altitude or elevation, etc.).

The conveyor segment 506 represents a variety of potential conveyor segments 506 that could be used. A conveyor segment 506 could include a single conveyor belt extending the length of a track, a cross-belt segment used in a cross-belt sorter, a tilt-tray used in a tilt-tray sorter, or a similar segment used to transport an item with a materials handling and sorting system or apparatus. The conveyor segment 506 can include one or more conveyor segment sensors 553 and a network interface 556.

A conveyor segment sensor 553 is sensor that measures a physical property of the conveyor segment 506 or detects an occurrence of an event. For example, a conveyor segment sensor 553 could include a speedometer that measures the speed at which the conveyor segment 506 is moving. As another example, a conveyor segment sensor 553 could include a radio frequency identification (RFID) reader to read an RFID tag affixed to an item 546 carried by the conveyor segment 506. As a third example, a conveyor segment sensor 553 could include a pressure sensor or scale that detects the presence of an item 546 on the conveyor segment 506 and/or determines how heavy the item 546 is.

The network interface 556 represents a device connecting the conveyor segment 506 to the network 513. Accordingly, the network interface 556 includes the circuitry necessary to communicate using the appropriate physical and/or data link layers of the network 513. Examples of a network interface 556 include a wired Ethernet interface, a WI-FI interface, as well as various other interfaces.

The air displacement device 509 represents a device that can directionally displace air. Examples of an air displacement device 509 include a fan (e.g., an axial flow fan, a centrifugal fan, a cross-flow fan, etc.), an air pump (e.g., a suction pump, a Venturi valve or a reverse Venturi valve, etc.), an air blower, as well as similar devices. In some embodiments, the air displacement device 509 may be reversible (i.e., can blow air away from or suck air towards the air displacement device 509). In some instances, the air displacement device 509 may be integrated into or mounted onto a conveyor segment 506. In other instances, the air displacement device 509 may be physically separated from the conveyor segment 506.

The air displacement device 509 can include an airflow controller 559 and one or more air displacement sensor(s) 563, which may be in data communication with the control application 516. The airflow controller 559 serves to control the rate at which air is displaced. For example, the airflow controller 559 could alter a fan motor speed or a pump motor speed to increase or decrease the rate at which air is displaced, or a flow control mechanism, e.g., one or more movable vanes, for varying the amount of air flowing into or out of the air displacement device. An air displacement sensor 563 measures the volume of air displaced and the rate at which it is displaced. The air displacement sensor 563 can accomplish this through several approaches. For example, the air displacement sensor 563 could measure the current speed (e.g., revolutions per minute) of the motor of the air displacement device 509 to calculate the air flow. As another example, the air displacement sensor 563 could correspond to an air vane that moves in proportion to airflow, allowing for airflow to be directly measured.

Next, a general description of the operation of the various components of the networked environment 500 is provided. To begin, one or more conveyor segments 506 located on a track are put into motion. As the conveyor segments 506 move along the track, items 546 are placed on individual ones of the conveyor segments 506.

After an item 546 is placed on a conveyor segment, its presence may be reported to the control application 516 by the conveyor segment 506. Some additional information about the item 546 (e.g., weight, size, identifier, etc.) may also be reported to the control application 516. Information about the item 546 can be used by the control application 516 to determine an appropriate flow rate 539 or resulting air pressure for a respective air displacement device 509 to generate.

Additional information may also be provided to or determined by the control application 516. This information can include the current location 533 of the conveyor segment 506 on a conveyor map 529, the current speed 543 of the conveyor segment 506, a flow rate 539 for air flow generated by a respective air displacement device 509, and potentially other data. This additional information can also be used by the control application 516 to determine an appropriate flow rate 539 for a respective air displacement device 509 to generate The control application 516 can then determine what an appropriate flow rate 539 would be for the air displacement device 509. Different items 549 may require different flow rates 539 in order to achieve a target force of static friction between the item 549 and the surface of the conveyor segment 506. Static friction is equal to the product of the normal force between an object and the surface on which it rests multiplied by the coefficient of static friction for that particular surface. Accordingly, heavier items 549 may require less air pressure to maintain a target force of static friction with the surface of the conveyor segment 506 than a lighter item 546 due to the magnitude of the normal force generated from the weight of heavier items 549. Likewise, a higher flow rate 539 may be required to achieve a target force of static friction for lighter items 546 because the magnitude of the normal force for lighter items 549 is too small given the weight of the lighter items. In both cases, the normal force can be adjusted by applying a positive air pressure or negative air pressure to an item 549, resulting in an increase or decrease of the force of static friction. As another example, higher target forces of static friction between an item 546 and the surface of the conveyor segment 506 may be required in order to move the conveyor segments 506 along a track at higher speeds. In other examples, changes in elevation of a conveyor segment, which can be determined based at least in part on the current location 533 of a conveyor segment 506, may require higher target forces of static friction (and accordingly higher flow rates 539) in order to prevent items 546 from either flying off of the conveyor segment when the conveyor angles downward, or tipping over when the conveyor inclines upward. Accordingly, the control application 516 could instruct an air displacement device 509 to adjust a flow rate 539 (e.g., increase the flow rate 539 or decrease the flow rate 539 as the situation warrants) for a conveyor segment 506 based at least in part on one or more of these factors.

Once the control application 516 determines a target flow rate 539 for a respective air displacement device 509, the control application 516 determines whether the current flow rate 539 matches the target flow rate 539. If the current flow rate 539 fails to match the target flow rate 539, the control application 516 can send a command or instruction to the airflow controller 559 of the respective air displacement device 509 to increase or decrease the current flow rate 539 to match the target flow rate 539.

In some instances, the conveyor segment 506 can be configured to communicate with the airflow controller 559 to modify the flow rate 539 without the intervention of the control application 516. For example, the conveyor segment 506 can use one or more conveyor segment sensors 553 to determine whether an item 546 is present on the conveyor segment 506. If an item 546 is determined to be present, control circuits in the conveyor segment 506 could automatically instruct the airflow controller 559 of a respective air displacement device 509 to activate the air displacement device 509. Similarly, if conveyor segment sensors 553 determine that an item 546 has been removed, control circuits in the conveyor segment 506 could automatically instruct the airflow controller 559 to deactivate the air displacement device 509. As an illustrative example, the conveyor segment 506 could include a pressure sensor that, when activated, causes the airflow controller 559 to activate the air displacement device 509. Similarly, when the pressure sensor is deactivated, the airflow controller 559 would deactivate the air displacement device 509. A weight scale could similarly be used, where zero weight causes the airflow controller 559 to deactivate the air displacement device 509, a low weight causes the airflow controller 559 to run at reduced speed or airflow, and a large weight causes the airflow controller 559 to run at full speed or airflow.

Figure 6:
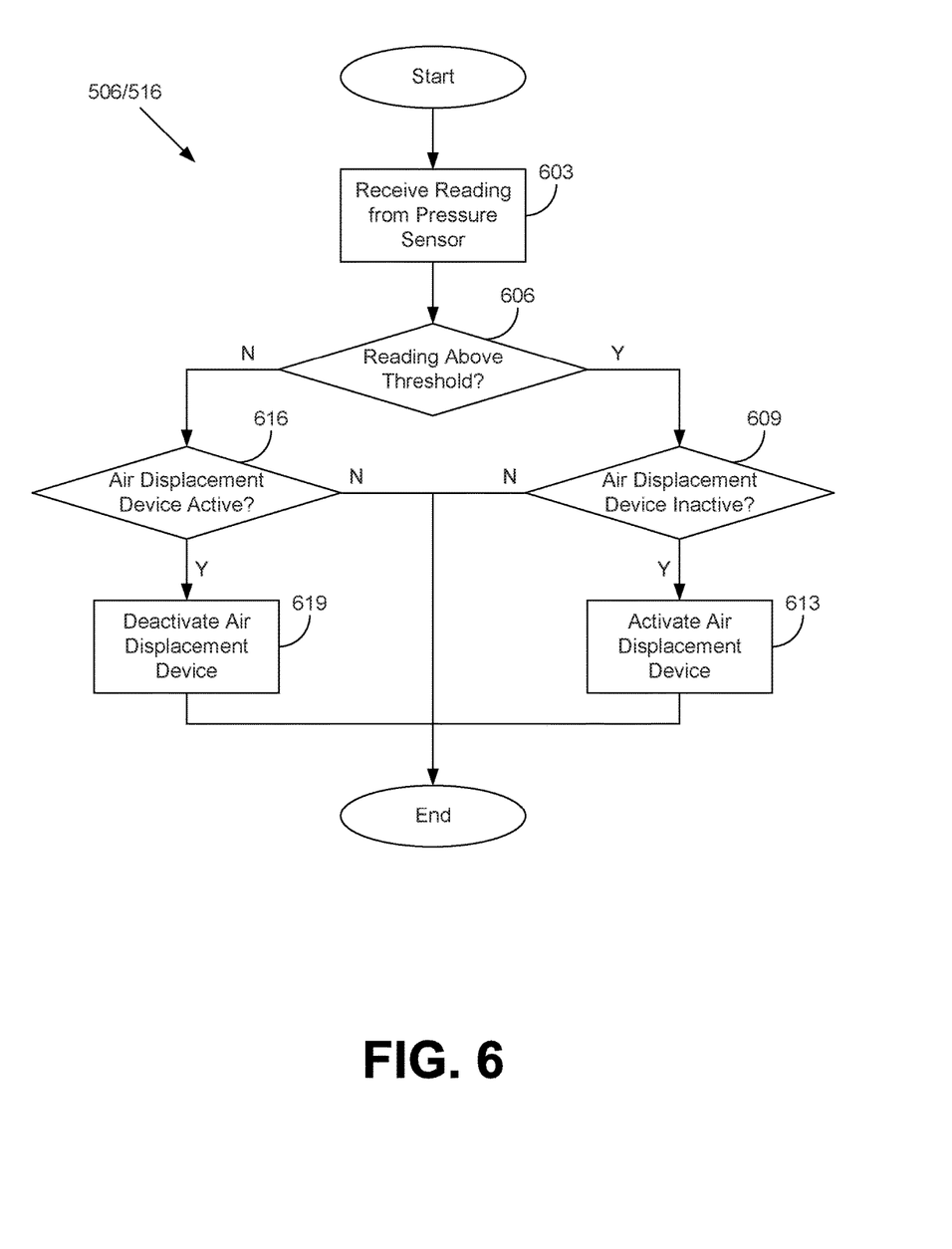
FIG. 6 is a flowchart illustrating one example of functionality implemented as portions of an application executed in in the networked environment of FIG. 5 according to various embodiments of the present disclosure.

Referring next to FIG. 6, shown is a flowchart that provides one example of the operation of a portion of the conveyor segment 506 according to various embodiments. It is understood that the flowchart of FIG. 6 provides merely an example of the many different types of functional arrangements that may be employed to implement the operation of the portion of the conveyor segment 506 as described herein. As an alternative, the flowchart of FIG. 6 may be viewed as depicting an example of elements of a method implemented in conveyor segment 506 according to one or more embodiments.

Beginning with box 603, control circuitry on the conveyor segment 506 receives a reading from a conveyor segment sensor 553 (FIG. 5), such as a pressure sensor. The reading can indicate that an item 546 (FIG. 5) has been placed on the conveyor segment 506 or that an item has been removed from the conveyor segment 506. For example, an increase in the measured weight or pressure could indicate that item 546 has been placed on the conveyor segment 506 while a decrease in the measured weight or pressure could indicate that the item 546 has been removed from the conveyor segment 506.

Proceeding to box 606, the control circuitry on the conveyor segment 506 determines whether the reading received from the conveyor segment sensor 553 is above or below a predefined threshold value in order to determine whether an item 546 has been placed on top of or removed from the conveyor segment 506. For example, if the reading is above a threshold value (corresponding to the additional weight of an item 546 added to the conveyor segment 506), then the process proceeds to box 609. However, if the is below a threshold value (corresponding to the decrease in measured weight as a result of an item 546 being removed from the conveyor segment 506), then the process proceeds instead to box 616.

If process proceeds to box 609, the control circuitry on the conveyor segment 506 checks the state of the air displacement device 509 (FIG. 5) to see if it is currently inactive. For example, the control circuitry on the conveyor segment 506 may send a signal or a request to the airflow controller 559 (FIG. 5) to determine if the air displacement device 509 is currently inactive (e.g., query to see if a fan motor is currently not running). If the air displacement device 509 is currently inactive, the process proceeds to box 613. However, if the air displacement device 509 is active, then the process subsequently ends.

Moving to box 613, the control circuitry on the conveyor segment 506 activates the air displacement device 509. For example, the control circuitry could send a signal or message to the airflow controller 559 that instructs the airflow controller 559 to turn on the motor controlling the air displacement device 509 (e.g., a fan motor). As another example, the control circuitry could send a signal or message to the airflow controller 559 that instructs the airflow controller 559 to adjust or increase the amount of air being displaced by the air displacement device (e.g., increase speed of fan motor from a lower speed to a higher speed). Execution of the process then subsequently ends.

However, if the process instead proceeded from box 606 to box 616, then the control circuitry on the conveyor segment 506 checks the state of the air displacement device 509 to see if it is currently active. For example, the control circuitry on the conveyor segment 506 may send a signal or a request to the airflow controller 559 to determine if the air displacement device 509 is currently active (e.g., query to see if a fan motor is currently running). If the air displacement device 509 is currently active, the process proceeds to box 619. However, if the air displacement device 509 is inactive, then the process subsequently ends.

Moving to box 619, the control circuitry on the conveyor segment 506 then deactivates the air displacement device 509. For example, the control circuitry could send a signal or message to the airflow controller 559 that instructs the airflow controller 559 to turn off the motor controlling the air displacement device 509 (e.g., a fan motor). As another example, the control circuitry could send a signal or message to the airflow controller 559 that instructs the airflow controller 559 to adjust or decrease the amount of air being displaced by the air displacement device (e.g., increase speed of fan motor from a higher speed to a lower speed). Execution of the process then subsequently ends.

Although the functional elements detailed above are described as being implemented by the conveyor segment 506, a similar method could be performed by the control application 516 (FIG. 5). In such an alternative embodiment, the control application 516 could receive a reading from the pressure sensor in a manner similar to that described at box 603. The control application 516 could then determine that the reading is above the threshold in a manner similar to that described at box 606. The control application 516 could then determine whether the air displacement device 509 is active or not by querying the airflow controller 559 in a manner similar to that described in boxes 609 and 616. Finally, the control application 516 could send a command to the airflow controller 559 to activate or deactivate the air displacement device 509 in a manner similar to that described in boxes 613 and 619.

Figure 7:
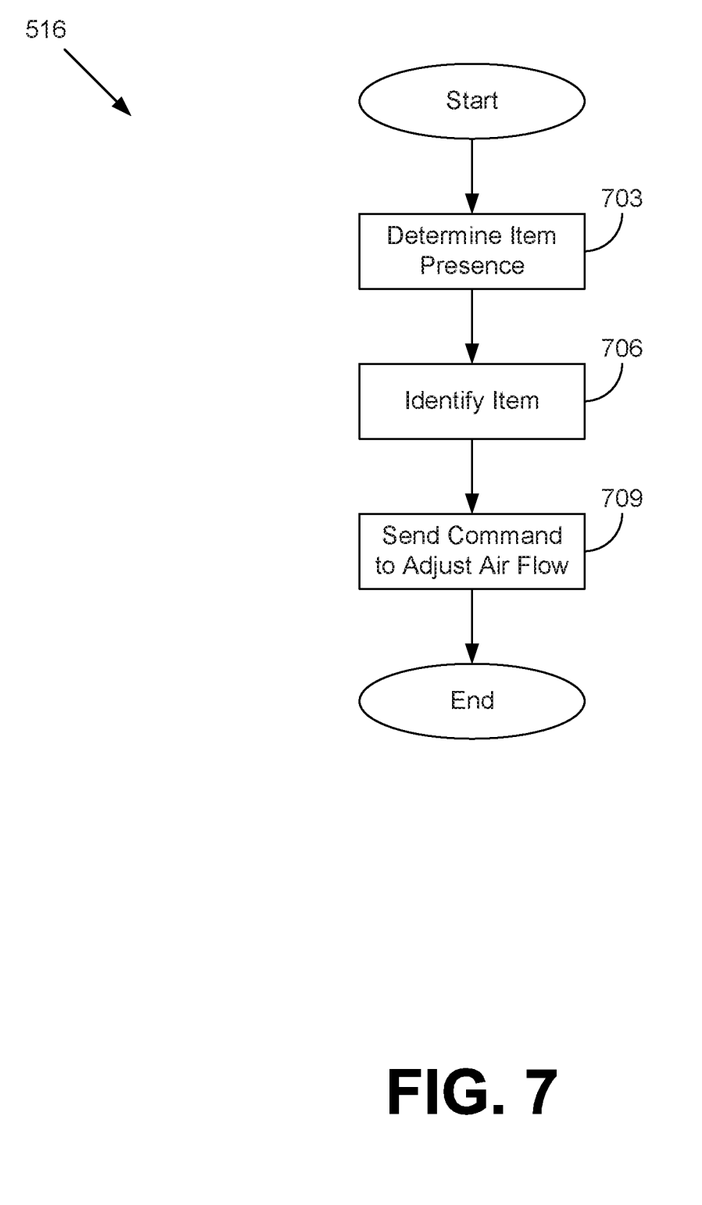
FIG. 7 is a flowchart illustrating one example of functionality implemented as portions of an application executed in the networked environment of FIG. 5 according to various embodiments of the present disclosure.

Referring next to FIG. 7, shown is a flowchart that provides one example of the operation of a portion of the control application 516 according to various embodiments. It is understood that the flowchart of FIG. 7 provides merely an example of the many different types of functional arrangements that may be employed to implement the operation of the portion of the control application 516 as described herein. As an alternative, the flowchart of FIG. 7 may be viewed as depicting an example of elements of a method implemented in the computing environment 503 (FIG. 5) according to one or more embodiments.

Beginning with box 703, the control application 516 determines that an item 546 (FIG. 5) is present on a conveyor segment 506 (FIG. 5). For example, the conveyor segment 506 could communicate to a reading or readings from one or more conveyor segment sensors 553 (FIG. 5). The control application 516 could then determine that an item 546 was present (e.g., due to a change in weight being recorded or a pressure indicating a present of the item 546). Other approaches may be used in various other embodiments.

Moving on to box 706, the control application 516 identifies the item 546 on the conveyor segment 506. For example, the control application 516 could send a command to the conveyor segment 506 to use a conveyor segment sensor 553 (e.g., an RFID reader) to obtain an item identifier 549 (FIG. 5—e.g., read an RFID tag affixed to the item 546) and return the result to the control application 516. The control application 516 could then use item identifier as a search value of an item catalog 526 (FIG. 5) to identify the item 546.

Proceeding next to box 709, the control application 516 sends a command to an airflow controller 559 to adjust the air flow rate of a respective air displacement device 509 (e.g., an air displacement device 509 mounted to the conveyor segment 506 or moving in tandem with the conveyor segment 506). For example, the control application 516 could send an instruction to increase the air flow in order to increase the static friction between the item 546 and the surface of the conveyor segment 506 if the item 546 is a lightweight item 546 that is likely to become airborne at speed. As another example, the control application 516 could send an instruction to decrease the air flow (or even generate reverse air flow) in order to decrease the static friction between the item 546 and the surface of the conveyor segment 506 if the item 546 is a heavier item 546 and too much static friction would prevent the item from being sorted at a later point by the materials handling system.

Figure 8:
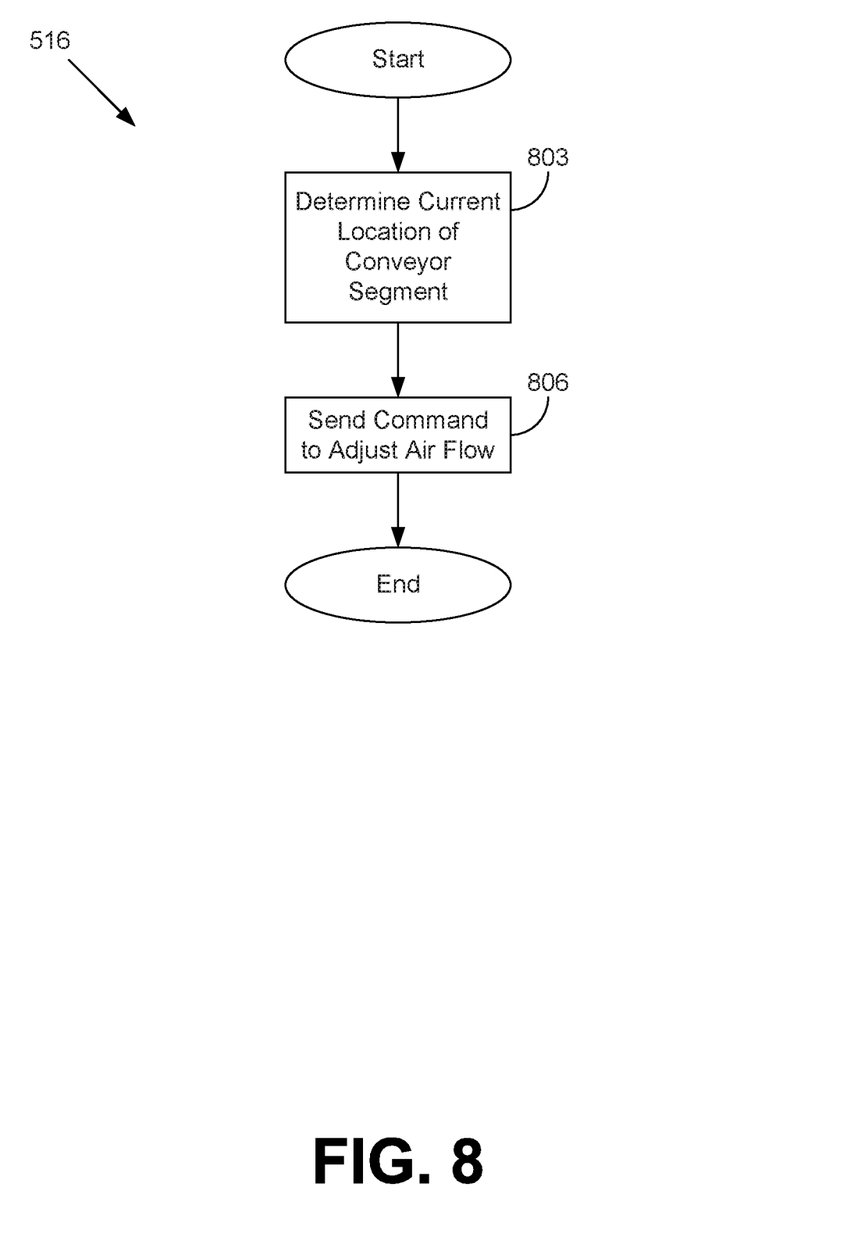
FIG. 8 is a flowchart illustrating one example of functionality implemented as portions of an application executed in the networked environment of FIG. 5 according to various embodiments of the present disclosure.

Referring next to FIG. 8, shown is a flowchart that provides one example of the operation of a portion of the control application 516 according to various embodiments. It is understood that the flowchart of FIG. 8 provides merely an example of the many different types of functional arrangements that may be employed to implement the operation of the portion of the control application 516 as described herein. As an alternative, the flowchart of FIG. 8 may be viewed as depicting an example of elements of a method implemented in the computing environment 503 (FIG. 5) according to one or more embodiments.

Beginning with box 803, the control application 516 determines the current location 533 (FIG. 5) of a conveyor segment 506 (FIG. 5). This can be accomplished using any one or more of several approached. For instance, the conveyor segment 506 could determine its own current location 533 and report its current location 533 to the control application 516. In other instances, the conveyor segment 506 could trigger some sensor to indicate its current location 533 along a track. As another example, the conveyor segment 506 could periodically broadcast a radio beacon that could be received by one or more sensors. The control application 516 could then use various multilateration approaches to determine the current location 533 of the conveyor segment 506 (e.g. time-delay on arrival, differences in signal strength, etc.). In other instances, as the conveyor segment 506 passed an image capture device (e.g., a camera) or some other sensor, the control application 516 could determine the current location 533 of the conveyor segment 506 based on its proximity to the sensor.

Proceeding to box 806, the control application 516 sends a command to an airflow controller 559 to adjust the air flow rate of a respective air displacement device 509 (e.g., an air displacement device 509 mounted to the conveyor segment 506 or moving in tandem with the conveyor segment 506). For example, the control application 516 could send an instruction to increase the air flow if the conveyor segment 506 is approaching a section of the track where increased static friction would be desirable (e.g., sharp turn, change in elevation, etc.). As another example, the control application 516 could send an instruction to decrease the air flow if the conveyor segment is approaching a section of the track where decreased static friction would be desirable. After sending the command, the process subsequently ends.

Figure 9:
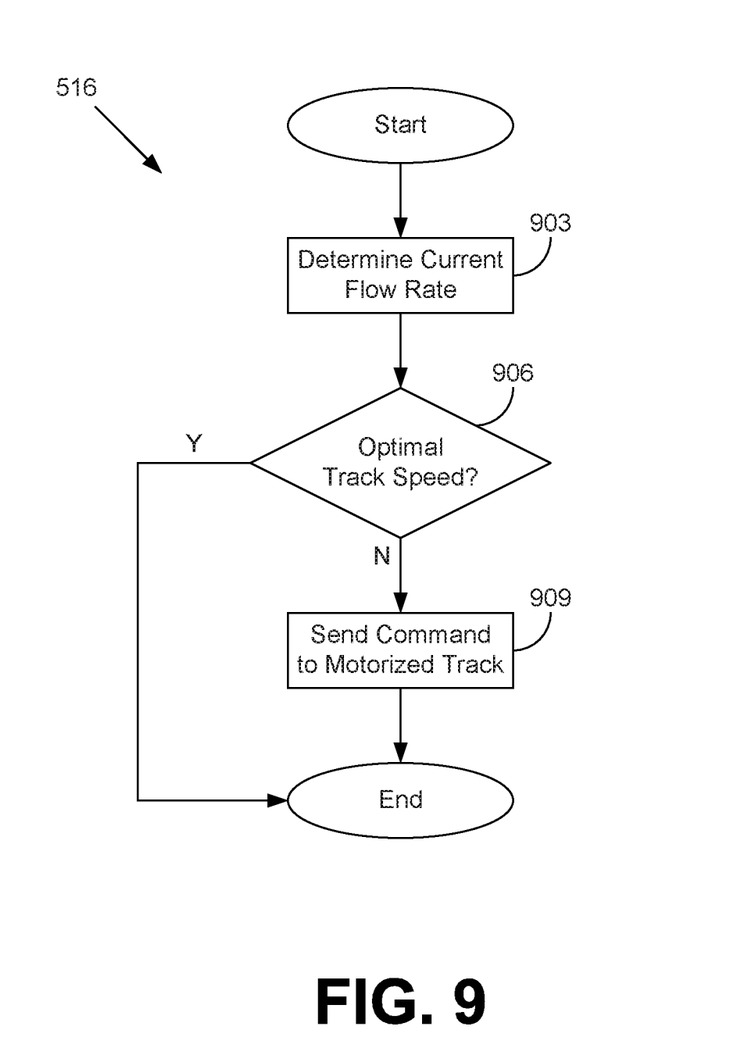
FIG. 9 is a flowchart illustrating one example of functionality implemented as portions of an application executed in the networked environment of FIG. 5 according to various embodiments of the present disclosure.

Referring next to FIG. 9, shown is a flowchart that provides one example of the operation of a portion of the control application 516 according to various embodiments. It is understood that the flowchart of FIG. 9 provides merely an example of the many different types of functional arrangements that may be employed to implement the operation of the portion of the control application 516 as described herein. As an alternative, the flowchart of FIG. 9 may be viewed as depicting an example of elements of a method implemented in the computing environment 503 (FIG. 5) according to one or more embodiments.

Beginning with box 903, the control application 516 determines the current air flow rate of an air displacement device 509 (FIG. 5). This can be accomplished in several ways. For instance, the control application 516 could send a query to the airflow controller 559 (FIG. 5) of the air displacement device 509 and receive a response indicating the current operating speed of the motor controlling the air displacement device 509. The control application 516 could then calculate the air flow rate based on the current operating speed of the motor. As another example, the control application 516 could query an air displacement sensor 563 (FIG. 5) and receive in response a reading indicating a measured amount of air flow.

Proceeding to box 906, the control application 516 can determine if the current speed 543 (FIG. 5) of the conveyor segment 506 (FIG. 5) corresponding to the air displacement device 509 is optimal for the determined air flow rate. This determination can be based on a number of factors, such as the weight of an item 546 or a type of item 546 on the conveyor segment 506 or other conveyor segments 506 of the track. If the current speed 543 is determined to be optimal (e.g., the fastest safe operating speed when the air displacement device 509 is operating at the measured air flow rate), then the process ends. Otherwise, the process proceeds to box 909.

Moving on to box 909, the control application 516 can then send a command to the track that is moving the conveyor segment 506 (FIG. 5). If the speed is too slow (e.g., the track can operate equally safely at a higher speed due to the airflow determined at box 903), then the control application 516 can send a command to the track to increase the current speed 543 of the conveyor segments 506. Similarly, if the speed is too fast (e.g., the track cannot operate safely at the current speed 543 because the airflow determined at box 903 is too low), then the control application can send a command to the track to decrease the current speed 543 of the conveyor segments 506 to the optimal track speed. Execution of the process subsequently ends.

Figure 10:
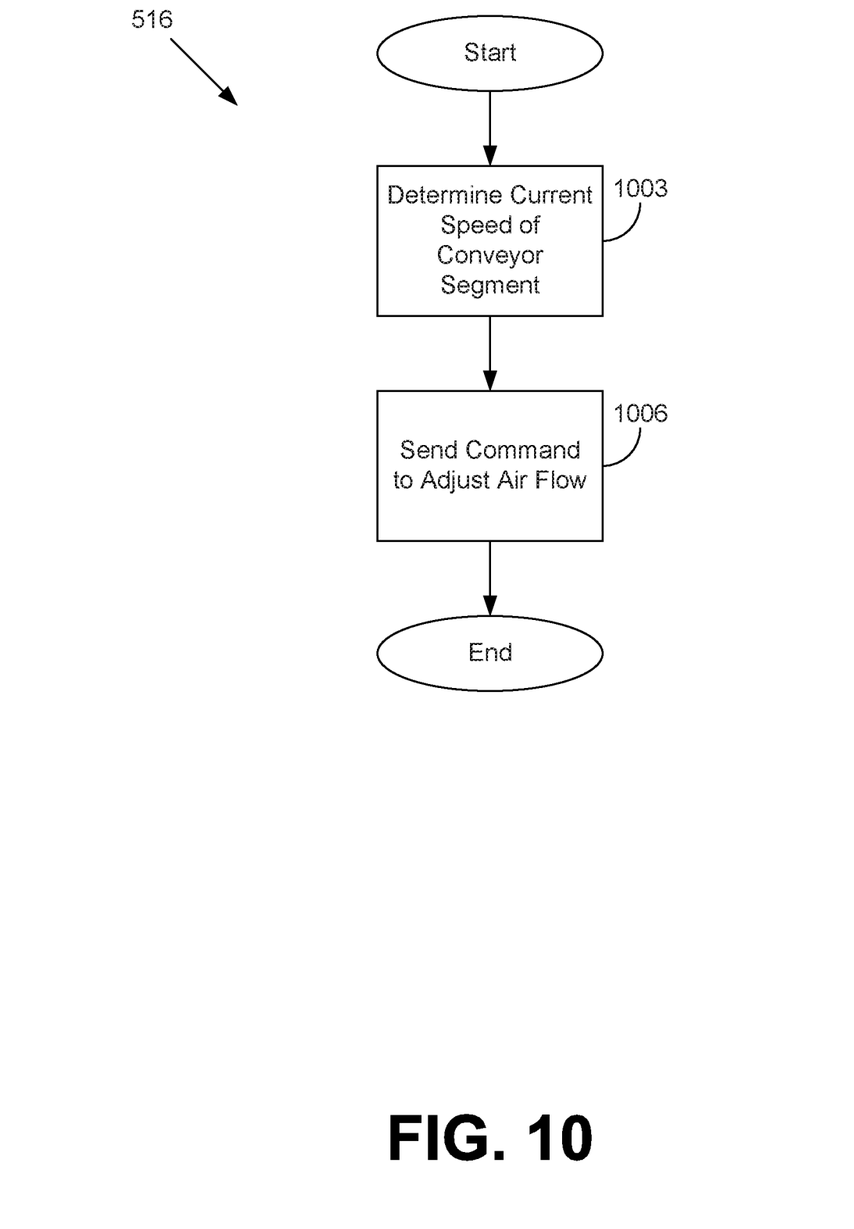
FIG. 10 is a flowchart illustrating one example of functionality implemented as portions of an application executed in the networked environment of FIG. 5 according to various embodiments of the present disclosure.

Referring next to FIG. 10, shown is a flowchart that provides one example of the operation of a portion of the control application 1003 according to various embodiments. It is understood that the flowchart of FIG. 10 provides merely an example of the many different types of functional arrangements that may be employed to implement the operation of the portion of the control application 1003 as described herein. As an alternative, the flowchart of FIG. 10 may be viewed as depicting an example of elements of a method implemented in the computing environment 503 (FIG. 5) according to one or more embodiments.

Beginning with box 1003, the control application 516 determines the current speed 543 (FIG. 5) of a conveyor segment 506 (FIG. 5). For instance, the conveyor segment 506 could determine its own current speed 543 and report its current speed 543 to the control application 516 on a periodic basis. The current speed 543 could be measured using a conveyor segment sensor 553, such as a speedometer. In another instance, the control application 516 could determine the location of the conveyor segment 506 at two different points in time and calculate the speed of the conveyor segment 506 based on the distance travelled between the two different points during the intervening interval of time.

Proceeding to box 1006, the control application 516 sends a command to an airflow controller 559 to adjust the air flow rate of a respective air displacement device 509 (e.g., an air displacement device 509 mounted to the conveyor segment 506 or moving in tandem with the conveyor segment 506). For example, the control application 516 could send an instruction to increase the air flow if the conveyor segment 506 is moving at a high rate of speed in order to prevent items from becoming airborne or otherwise "flying off" of the conveyor segment 506. As another example, the control application 516 could send an instruction to decrease the air flow if the conveyor segment 506 is operating a lower rate of speed in order to save power, decrease static friction to avoid unintended jams of equipment, etc. After the command is sent, the process subsequently ends.

Figure 11:
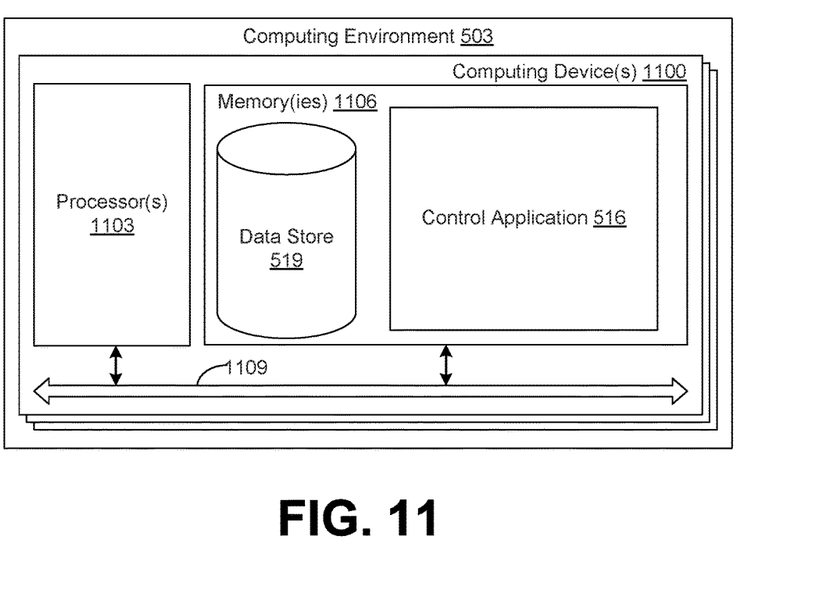
FIG. 11 is a schematic block diagram that provides one example illustration of a computing environment employed in the networked environment of FIG. 5 according to various embodiments of the present disclosure.

With reference to FIG. 11, shown is a schematic block diagram of the computing environment 503 according to an embodiment of the present disclosure. The computing environment 503 includes one or more computing devices 1100. Each computing device 1100 includes at least one processor circuit, for example, having a processor 1103 and a memory 1106, both of which are coupled to a local interface 1109. To this end, each computing device 1100 may include, for example, at least one server computer or like device. The local interface 1109 may include, for example, a data bus with an accompanying address/control bus or other bus structure as can be appreciated.

Stored in the memory 1106 are both data and several components that are executable by the processor 1103. In particular, stored in the memory 1106 and executable by the processor 1103 is the control application 516 and potentially other applications. Also stored in the memory 1106 may be a data store 519 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 1103 may represent multiple processors 1103 or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106. The local interface 1109 may include additional systems designed to coordinate this communication, including, for example, performing load balancing. The processor 1103 may be of electrical or of some other available construction.

Although the control application 516 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6-10 show the functionality and operation of an implementation of portions of the control application 516 or control circuits of the conveyor segment 506. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 1103 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 6-10 show a specific order of execution, it is understood that the order of execution may differ from that which is depicted. For example, the order of execution of two or more blocks may be scrambled relative to the order shown. Also, two or more blocks shown in succession in FIGS. 6-10 may be executed concurrently or with partial concurrence. Further, in some embodiments, one or more of the blocks shown in FIGS. 6-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the control application 516 or control circuits of the conveyor segment 506, that includes software or code can be embodied in any non-transitory computer-readable medium for use by or in connection with an instruction execution system such as, for example, a processor 1103 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the control application 516 or control circuits of the conveyor segment 506, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1100, or in multiple computing devices in the same computing environment 503.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a track;
   a tilt tray affixed to the track, the tilt tray comprising:
      a perforated surface;
      a pressure sensor connected to the perforated surface; and
      a fan mounted underneath the perforated surface, the fan comprising a plurality of fan blades connected to a fan motor controlled by a fan controller;
   an electric rail mounted to the track that provides power to the tilt tray and the fan;
   a computing device in data communication with the fan and the tilt tray, the computing device comprising a processor and a memory; and
   machine readable instructions stored in the memory that, when executed by the processor, cause the computing device to:
      determine that an item is present on the tilt tray based at least in part on a reading generated by the pressure sensor;
      determine an appropriate air pressure to generate in order to retain the item on the tilt tray when the tilt tray moves along the track at a particular speed, wherein the appropriate air pressure is determined based at least in part on the reading generated by the pressure sensor; and
      send a command to the fan controller to adjust a speed of the fan motor to generate the appropriate air pressure.

2. The system of claim 1, wherein the machine readable instructions further cause the computing device to:
   determine a current location of the tilt tray;
   determine an updated appropriate air pressure to generate to retain the item on the tilt tray when the tilt tray moves along the track at the particular speed at or proximate to the current location; and
   send a command to the fan controller to adjust the speed of the fan motor to generate the updated appropriate air pressure.

3. The system of claim 1, wherein the machine readable instructions further cause the computing device to:
   determine an updated speed of the tilt tray;
   determine an updated appropriate air pressure to generate to retain the item on the tilt tray when the tilt tray moves along the track at the updated speed; and
   send a command to the fan controller to adjust the speed of the fan motor to generate the updated appropriate air pressure.

4. A system, comprising:
   a track;
   a conveyor segment affixed to the track, the conveyor segment comprising an air permeable surface;
   an air displacement device underneath the air permeable surface configured to move air through the air permeable surface, thereby increasing a static frictional force upon the air permeable surface;
   a computing device in data communication with the air displacement device, the computing device comprising a processor and a memory; and
   machine readable instructions stored in the memory that, when executed by the processor, cause the computing device to:
      determine that an item is present on the conveyor segment;
      identify the item present on the conveyor segment; and
      send a command to the air displacement device to adjust a flow rate based at least in part on an identification of the item.

5. The system of claim 4, wherein the air displacement device comprises a fan.

6. The system of claim 4, wherein the air displacement device comprises a reverse Venturi valve.

7. The system of claim 4, wherein the air displacement device comprises a suction pump.

8. The system of claim 4, wherein the conveyor segment comprises a tilt-tray.

9. The system of claim 4, wherein the conveyor segment comprises a cross-belt segment and the air permeable surface comprises a perforated conveyor belt positioned at an angle relative to a direction of the track.

10. The system of claim 4, further comprising an electric rail affixed to the track, wherein the electric rail provides power to the conveyor segment and the air displacement device.

11. The system of claim 4, wherein:
    the conveyor segment further comprises a pressure sensor connected to the air displacement device; and
    the air displacement device is activated in response to receipt of a reading from the pressure sensor.

12. The system of claim 4,
    wherein the machine readable instructions stored in the memory, when executed by the processor, further cause the computing device to:
       determine a current location of the conveyor segment on the track; and
       send a command to the air displacement device to adjust a flow rate based at least in part on the current location of the conveyor segment on the track.

13. The system of claim 4,
    wherein the computing device is in data communication with the track and the machine readable instructions stored in the memory, when executed by the processor, further cause the computing device to:
       determine a flow rate of the air displacement device; and
       cause a change in speed of the conveyor segment based at least in part on the flow rate of the air displacement device.

14. The system of claim 4,
    wherein the computing device is in data communication with the conveyor segment and the machine readable instructions stored in the memory that, when executed by the processor, further cause the computing device to:
       determine a current speed of the conveyor segment; and
       send a command to the air displacement device to adjust a flow rate based at least in part on the current speed of the conveyor segment.

15. A system, comprising:
    a track;
    a conveyor segment affixed to the track, the conveyor segment comprising an air permeable surface;
    a series of air displacement devices positioned above the track such that air exiting each air displacement device in the series of air displacement devices flows through the air permeable surface of the conveyor segment;
    a computing device in data communication with individual air displacement devices in the series of air displacement devices, the computing device comprising a processor and a memory; and
    machine readable instructions stored in the memory that, when executed by the processor, cause the computing device to:
       determine a current location of a conveyor segment on the track; and
       send a command to individual air displacement devices in the series of air displacement devices to adjust a flow rate based at least in part on the current location of the conveyor segment on the track.

16. The system of claim 15, wherein the conveyor segment comprises a cross-belt segment and the air permeable surface comprises a perforated conveyor belt positioned at an angle relative to the direction of the track.

17. The system of claim 15, wherein the conveyor segment comprises a conveyor belt.

18. The system of claim 15, wherein the conveyor segment comprises a tilt tray.

19. The system of claim 15, wherein at least one air displacement device in the series of air displacement devices is a reverse Venturi valve.

20. The system of claim 15, wherein at least one air displacement device in the series of air displacement devices is a suction pump.

* * * * *